United States Patent
Male

(10) Patent No.: US 8,991,424 B2
(45) Date of Patent: Mar. 31, 2015

(54) FUEL PRESSURE REGULATION SYSTEM AND AN IMPROVED FUEL PRESSURE REGULATOR FOR USE THEREIN

(75) Inventor: Andrew Male, Walton on Thames (GB)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 892 days.

(21) Appl. No.: 13/060,451

(22) PCT Filed: Aug. 28, 2009

(86) PCT No.: PCT/EP2009/061133
§ 371 (c)(1),
(2), (4) Date: Feb. 24, 2011

(87) PCT Pub. No.: WO2010/023276
PCT Pub. Date: Mar. 4, 2010

(65) Prior Publication Data
US 2011/0146625 A1 Jun. 23, 2011

(30) Foreign Application Priority Data
Aug. 29, 2008 (EP) ..................................... 08163284

(51) Int. Cl.
*F16K 3/26* (2006.01)
*F02M 37/00* (2006.01)
*G05D 16/10* (2006.01)

(52) U.S. Cl.
CPC ....... *F02M 37/0058* (2013.01); *F02M 37/0029* (2013.01); *G05D 16/103* (2013.01); *F02M 37/0052* (2013.01)
USPC ..................................... 137/625.35; 251/117

(58) Field of Classification Search
USPC ........... 137/625.33–625.38; 251/117
See application file for complete search history.

(56) References Cited

U.S. PATENT DOCUMENTS 3,952,993 A * 4/1976 Roberts et al. .................. 251/20
4,557,287 A 12/1985 Laufer
(Continued)

FOREIGN PATENT DOCUMENTS

CN 101932819 A 12/2010
DE 3341300 5/1985
(Continued)

OTHER PUBLICATIONS

Letter regarding comments for Japan Office Action dated Jan. 22, 2013.
(Continued)

*Primary Examiner* — John Fox
(74) *Attorney, Agent, or Firm* — Mark H. Avoboda

(57) ABSTRACT

A fuel pressure regulation system for a compression ignition diesel engine. The system comprises a fuel supply line connected to an inlet of a transfer pump and a transfer pressure fuel line connected between the transfer pump outlet and the high pressure fuel pump inlet. A fuel filter is positioned in the transfer pressure fuel line and a fuel spill line fluidly connects a fuel pressure regulator to the transfer pressure fuel line at a point between the transfer pump outlet and the fuel filter. A fuel return line is connected between the fuel pressure regulator and the fuel supply line and a control fuel line is connected between the fuel pressure regulator and the transfer pressure fuel line. The fuel pressure regulator comprises a bore within which is located a valve member moveable from a non-regulating position of the fuel pressure regulator to a regulating position of the fuel pressure regulator. In use, any fuel entering the bore through a control fuel line connection acts upon a valve member thrust surface which results in a force acting to open the fuel pressure regulator. Any fuel entering the bore through the fuel spill line connection enters a region between the first end and the second end of the bore. There is provided a leak passageway connected from a point between the first and second ends and a fuel return line connection. In normal operating use, a fuel flow path from the fuel spill line connection to the fuel return line connection is kept open when the fuel pressure regulator is in the non-regulating position.

10 Claims, 3 Drawing Sheets

(56) References Cited

U.S. PATENT DOCUMENTS

| | | |
|---|---|---|
| 6,209,523 B1 | 4/2001 | Lehtonen |
| 6,601,565 B2 | 8/2003 | Tofan-Petre |
| 7,640,919 B1 | 1/2010 | Smith |
| 7,874,284 B2 | 1/2011 | Sano |
| 2003/0154959 A1 | 8/2003 | Rembolt et al. |
| 2003/0188716 A1 | 10/2003 | Grossner et al. |
| 2008/0178849 A1 | 7/2008 | Crary |
| 2009/0145402 A1* | 6/2009 | Sano .......................... 123/447 |

FOREIGN PATENT DOCUMENTS

| | | |
|---|---|---|
| DE | 10061296 | 6/2002 |
| DE | 10351507 | 6/2005 |
| DE | 102005023700 | 11/2006 |
| DE | 102006037174 | 2/2008 |
| EP | 0964153 | 12/1999 |
| JP | 2009-138595 | 6/2009 |
| WO | 02/36997 A2 | 5/2002 |
| WO | 02/42633 | 5/2002 |
| WO | 02/063158 | 8/2002 |

OTHER PUBLICATIONS

European Search Report dated Apr. 28, 2009.
International Search Report dated Jun. 28, 2010.
English Translation of China Office Action dated Apr. 3, 2013.

* cited by examiner

FUEL PRESSURE REGULATION SYSTEM AND AN IMPROVED FUEL PRESSURE REGULATOR FOR USE THEREIN

TECHNICAL FIELD

The present invention relates to an improved fuel pressure regulation system, and an improved fuel pressure regulator for use therein, for regulating the pressure of fuel at the inlet to a high pressure diesel fuel injection pump. The improved fuel pressure regulation system provides an extended fuel filter working life. The improved fuel pressure regulator is more robust as it can handle clean fuel from a control fuel line and contaminated fuel from a fuel spill line without any cross-contamination and without any debris within the contaminated fuel damaging, or causing seizure of the fuel pressure regulator, such that a subsequent loss of function is prevented.

BACKGROUND OF THE INVENTION

The low pressure fuel system of a typical heavy duty diesel engine having a common rail fuel system consists of a transfer pump which lifts fuel from a fuel tank via a first stage, coarse mesh fuel filter. The transfer pump raises the pressure of the fuel to an intermediate pressure level and the fuel is then passed to the inlet of a high pressure fuel pump via fine mesh filters. In order that the fuel pressure at the output of the high pressure pump can be closely controlled, it is necessary to control the pressure of fuel at its inlet. It is known to use a fuel pressure regulation system in which a fuel pressure regulator spills fuel from the high pressure side to the low pressure side of the transfer pump, to maintain the fuel pressure at the inlet to the high pressure pump at or below a pre-determined level. In prior art arrangements the spill line is located downstream of the fine mesh filters. As a result the flow rate through the fine mesh filters is relatively high, because all of the fuel pumped by the transfer pump passes through them. Consequently, the working life of the filters is reduced because the pressure drop across the filters increases as the flow rate increases and hence the maximum allowable pressure drop across the filters is reached more quickly with high flow rates.

SUMMARY OF THE INVENTION

It is advantageous to have a longer working life as this has associated cost benefits. Consequently, there is a need for an improved fuel regulation system.

According to a first aspect of the present invention there is provided a fuel pressure regulation system comprising a fuel supply line fluidly connecting a fuel supply to an inlet of a transfer pump, a transfer pressure fuel line fluidly connecting an outlet of the transfer pump to an inlet of a high pressure fuel pump, a fuel filter positioned in the transfer pressure fuel line, a fuel spill line fluidly connecting a fuel pressure regulator to the transfer pressure fuel line, a fuel return line fluidly connecting the fuel pressure regulator and the fuel supply line and a control fuel line fluidly connecting the fuel pressure regulator to the transfer pressure fuel line, characterised in that the fuel spill line is fluidly connected to the transfer pressure fuel line at a point between the outlet of the transfer pump and the fuel filter. This arrangement is advantageous because only the fuel that needs to be supplied to the high pressure fuel pump is passed through the fine mesh filters. Any excess fuel supplied by the transfer pump is spilt from the outlet of the transfer pump back to the fuel supply line, i.e. back to the fuel supply, for example a fuel tank, or back to the fuel supply line between the fuel supply and the inlet to the transfer pump. In this way the flow rate of fuel through the filter is kept as low as possible.

In a preferred embodiment of the present invention the control fuel line is fluidly connected to the transfer pressure fuel line at a point between the fine mesh fuel filters and the inlet to the high pressure pump. It is preferable to control the fuel pressure regulator using a fuel supply taken from the inlet to the high pressure pump because this enables precise control of the output flow from the high pressure pump. As the fine mesh filters clog, the pressure drop across the filters increases, the pressure within the supply line downstream of the filters reduces and thus the pressure within the control fuel line reduces. This results in the fuel pressure regulator moving towards the closed position and thereby results in less fuel being spilt from the supply line through the fuel pressure regulator along the spill line. In turn, this results in the fuel pressure within the supply line increasing. In this way the system compensates for the gradual clogging of the fine mesh filters (over their service life) by increasing the pressure in the supply line such that the consequential increase in filter pressure drop will not affect the fuel pressure at the Inlet Metering Valve (IMV). The IMV is an electrically variable orifice that controls the flow into the high pressure pump. It is important to have precise control of the fuel pressure at the inlet to the IMV because the characteristic of the IMV (flow versus electric current) is critical and it is sensitive to the inlet fuel pressure.

According to a second aspect of the present invention there is provided a fuel pressure regulator comprising a bore within which is located a valve member moveable from a non-regulating position of the fuel pressure regulator, wherein a first end of the bore is closed, to an regulating position of the fuel pressure regulator, wherein the first end of the bore is open, a control fuel line connection positioned at a second end of the bore, such that, in use, any fuel entering the bore through the control fuel line connection acts upon a thrust surface provided on the valve member resulting in a force acting on the valve member in a direction to open the fuel pressure regulator, an upper clearance between the valve member and the second end of the bore, a fuel spill line connection positioned in the bore such that, in use, any fuel entering the bore through the fuel spill line connection enters a region between the first end and the second end of the bore, characterised in that there is provided a lower clearance in the bore between the first end and the second end, and a leak passageway connected between a point between the lower clearance and the second end of the bore, and a fuel return line connection, such that, in normal operating use, a fuel flow path from the fuel spill line connection to the fuel return line connection is kept open when the fuel pressure regulator is in the non-regulating position. Normal operating use of the fuel pressure regulator is considered to occur when the diesel engine to which it is attached is running at a speed between its idling speed and its maximum speed.

Preferably, the leak passageway passes through the valve member. It is envisaged that, in an alternative embodiment of the present invention, the conduit forming the static leak passageway may pass through the regulator housing, or along any other suitable path.

Preferably, there is provided an expansion volume between the lower clearance and the upper clearance and the leak passageway is fluidly connected to that expansion volume. The purpose of the expansion volume is to create a region between the lower clearance and the upper clearance where the fuel is at a pressure lower than the pressure of fuel entering the fuel pressure regulator through the supply line connection. In use, any fuel passing through the lower clearance flows into the low pressure region rather than through the upper clearance, which is at a higher pressure. Consequently, any fuel entering the fuel pressure regulator through the fuel spill line connection does not enter the upper clearance, thus preventing the upper clearance from becoming blocked by debris, for example, particulate debris, carried in that fuel. This is advantageous because it prevents debris from causing valve seizure and thus loss of pressure regulation.

Preferably, the expansion volume extends around the periphery of the valve member. The expansion volume may extend around the periphery of the valve member and/or around the periphery of the bore. This is advantageous because it enables the pressure within the expansion volume to be equalised so that there is, in all places around the expansion volume, a low pressure area into which fuel from the fuel supply line and the fuel spill line can flow.

Preferably, in normal operating use, the cross-sectional area of the lower clearance is large enough to enable free passage of any contaminants within the fuel entering the fuel pressure regulator through the fuel spill line connection. This is advantageous because it helps to prevent the fuel pressure regulator from being damaged by debris trapped within the clearance. Fuel entering the fuel pressure regulator through the fuel spill line has been passed only through a gauze, or coarse mesh filter, and thus, typically, contains particulate matter up to 100 microns across. Therefore, the minimum cross-sectional dimension of the lower clearance is typically around 100 microns. The minimum cross-sectional dimension should not be much larger than the expected size of particulate matter in order to keep fuel flow through the lower clearance, and thus through the static leak passageway, to a minimum in order to prevent an unnecessary reduction in the volumetric and mechanical efficiency of the transfer pump.

Preferably, in normal operating use, the cross-sectional area of the upper clearance is small enough to prevent free passage of any contaminants within the fuel entering the fuel pressure regulator through the fuel spill line connection. The upper clearance is sized to ensure that the valve member is adequately guided within the bore to ensure that the spacial relationship between the valve member and the bore, and in particular the spacial relationship between the valve seat provided on the valve member and the valve seat provided on the bore, remain consistent to ensure consistent performance of the fuel pressure regulator. In addition, the upper clearance is sized to ensure that the static leakage through the upper clearance is kept to a minimum to prevent any unnecessary loss of fuel pressure and thus reduction in the volumetric and mechanical efficiency of the transfer pump.

Preferably, the lower clearance is located between the valve member and the bore.

Preferably, in a non-regulating position of the fuel pressure regulator, a lower start-up clearance and an upper start-up clearance (the upper and lower start-up clearances could also be referred to as priming clearances because they are also beneficial when priming the fuel system) are located in the bore between the first end and the second end, the upper and lower start-up clearances each having a smaller cross-sectional flow area than the lower clearance. In reducing the flow area of the start-up clearances less fuel is able to spill between the outlet from the transfer pump and its inlet thereby increasing the amount of fuel that is pumped towards the high pressure pump inlet.

Preferably, the bore is provided with a widened region of increased cross-sectional area between the first end and the second end and the valve member comprises an upper region and an overlap region, wherein, in use, the upper region is located between the fuel spill line connection and the second end and the overlap region is located between the fuel spill line connection and the first end and wherein when the fuel pressure regulator is in a non-regulating position there is only a start-up clearance between a part of the upper region and the bore and wherein when the fuel pressure regulator is in the regulating position all of the upper region is located adjacent to the widened region such that the lower clearance is provided between the valve member and the region.

Preferably, in use, when the valve member moves from the non-regulating position towards the regulating position of the fuel pressure regulator, after a first stage of movement of the valve member the upper clearance is provided between the valve member and the widened region and the lower start-up clearance is provided between the valve member and the bore and after a second stage of movement of the valve member the upper clearance is provided between the valve member and the widened region and a lower clearance is provided between the valve member and the bore. In the non-regulating position the backleakage through the regulator from the pump outlet to the pump inlet is reduced as a result of the start-up clearances. This is beneficial both during engine starting and priming, for example when the system is first charged with fuel, or if it is necessary to prime the fuel system if it has run dry. During engine starting the reduced backleakage means that fuel pressure rises more quickly and the engine will start after fewer revolutions. This helps meet customer starting specifications. During priming, air in the system is less able to recirculate around the pump, because the fuel pressure regulator is in a closed, non-regulating position which forces the air to instead pass along the fuel supply line through the fine mesh filters to the IMV. At both the filters and the IMV there is provided a bleed orifice which enables the air to be bled from the system. As a result, air will more quickly be purged from the system, which reduces the time to start the engine.

BRIEF DESCRIPTION OF THE DRAWINGS

Preferred embodiments of the present invention will now be described with reference to the accompanying drawings in which.

BEST MODE FOR CARRYING OUT THE INVENTION

Figure 1:
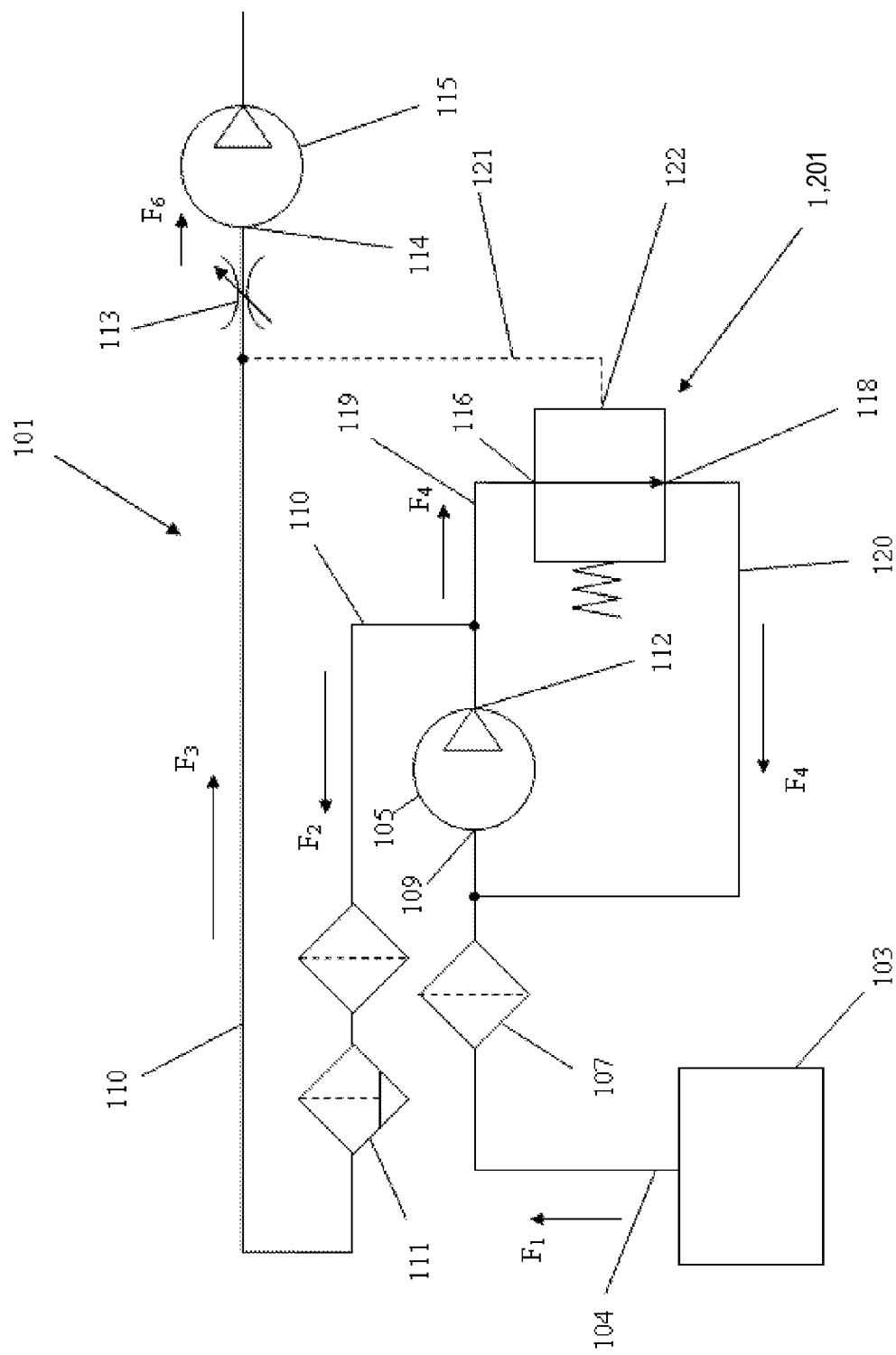
FIG. 1 is a schematic diagram of a low pressure fuel regulation system for a heavy duty diesel engine, according to a first aspect of the present invention.

The first aspect of the present invention is a fuel pressure regulation system 101, as shown in FIG. 1, which comprises a fuel tank 103 which is connected by a suction line 104 to the inlet 109 of a fuel transfer pump 105. A coarse mesh filter 107 is located in the suction line 104 between the tank 103 and the inlet 109. A fuel supply line 110 connects the output 112 of the transfer pump 105 to the inlet 114 of a high pressure fuel pump 115. Fine mesh filters 111 are located in the supply line 110 between the output 112 and the inlet 114 and an inlet metering valve 113 is provided between the fine mesh filters 111 and the inlet 114.

Figure 2:
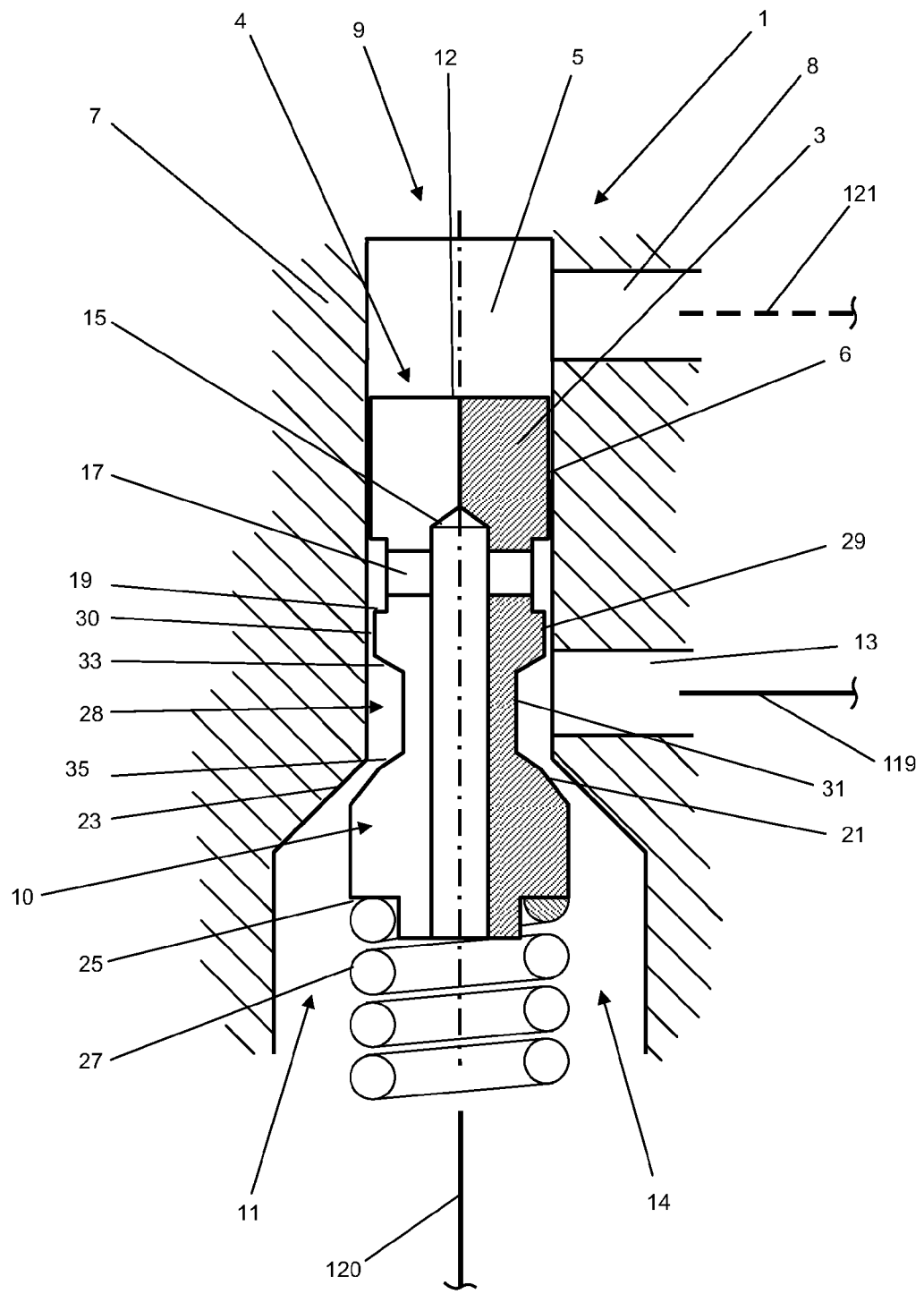
FIG. 2 is a schematic partial cross-sectional view of a fuel pressure regulator, for use in a fuel regulation system as shown in FIG. 1, according to a preferred embodiment of a second aspect the present invention, showing the fuel pressure regulator in a regulating position.
Figure 3:
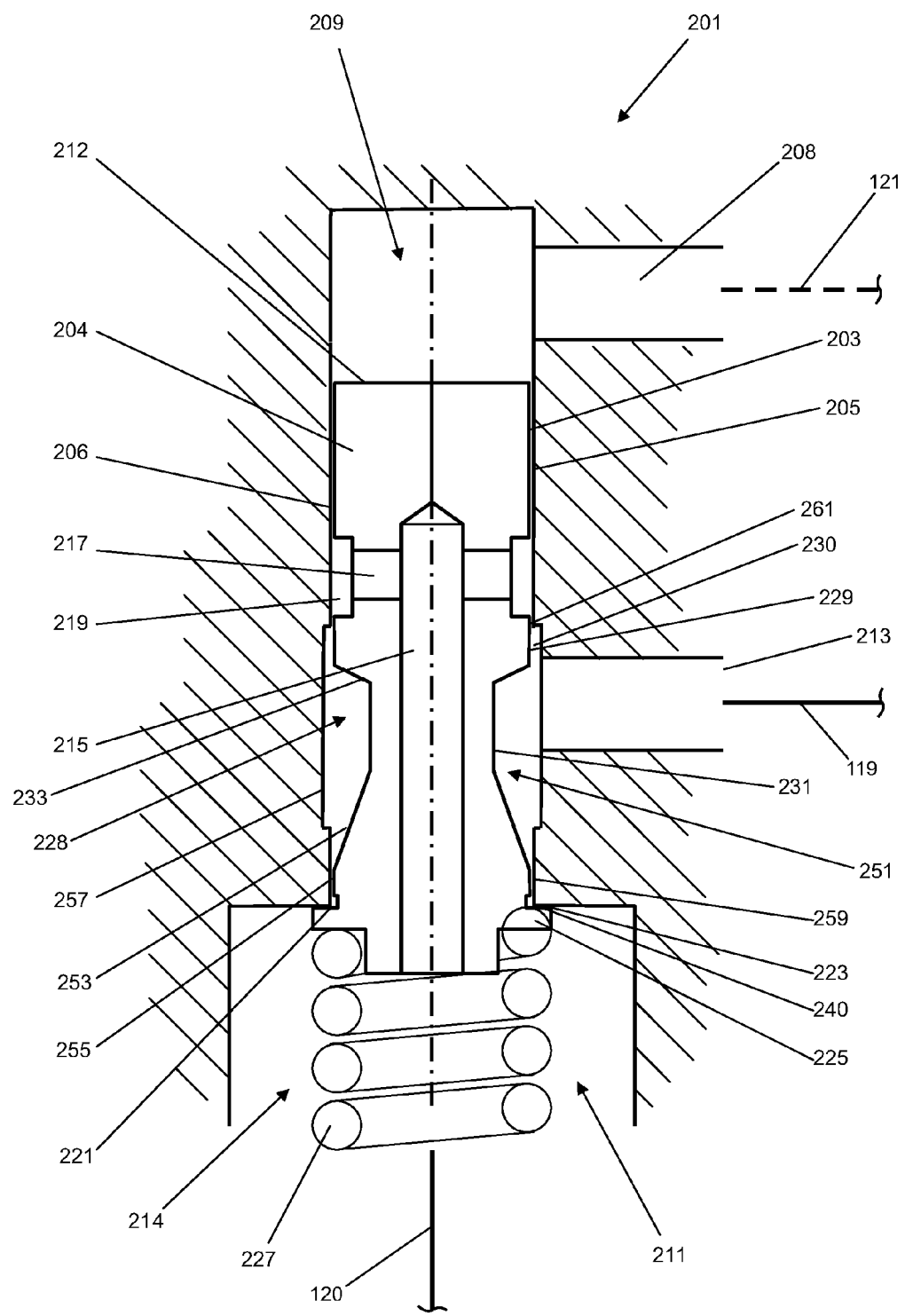
FIG. 3 is a schematic partial cross-sectional view of a fuel pressure regulator, for use in a fuel regulation system as shown in FIG. 1, according to an alternative embodiment of the second aspect of the present invention, showing the fuel pressure regulator in a non-regulating position.

The system 101 also comprises a three port fuel pressure regulator, indicated as 1 (the embodiment of FIG. 2) or alternatively 201 (the embodiment of FIG. 3). A fuel spill line 119 is connected between the transfer pump outlet 112 and a first port 116 of the fuel pressure regulator 1, 201. A fuel return line 120 is connected between a second port 118 of the fuel pressure regulator 1, 201 and a point in the fuel suction line 104 between the coarse mesh filter 107 and the inlet 109. A control fuel line 121 is connected between a point in the fuel supply line 110 between the fine mesh filters 111 and the inlet metering valve 113 and a third port 122 of the fuel pressure regulator 1, 201.

Under normal operating conditions, i.e. when the engine is running at a speed between idle speed and maximum speed, fuel flows from the fuel tank 103 along suction line 104, in the direction shown by arrow $F_1$, under the action of the transfer pump 105. The fuel undergoes a first stage of filtration as it flows through the coarse mesh filter 107 to the inlet 109 of the transfer pump 105. The transfer pump 105 raises the pressure of the fuel and pumps the fuel to the fine mesh filters 111, as indicated by arrow $F_2$. After passing through the fine mesh filters 111 the fuel flows to the inlet metering valve 113, adjacent to the inlet of the high pressure fuel pump 115, as indicated by arrow $F_3$. The fuel then flows through the inlet metering valve 113 to the inlet to the high pressure pump 115, as indicated by arrow $F_6$. In the high pressure pump 115 the pressure of the fuel is raised further, to a level suitable for injection into the diesel engine.

Under normal operating conditions, the fuel pressure regulator 1, 201 is in a regulating position, to ensure that the fuel pressure at the inlet 114 is always at the correct level. In the regulating position, a proportion of the fuel leaving the transfer pump outlet 112 is always returned back to the transfer pump inlet 109, via the spill line 119, the fuel pressure regulator 1, 201 and the fuel return line 120, as indicated by arrows $F_4$. The amount of fuel spilt through the fuel pressure regulator 1, 201 depends upon the degree of pressure reduction that is required to maintain the fuel pressure at the inlet 114 at the desired level.

The fuel pressure regulator 1, 201 is opened and closed under the action of pressurised fuel within the control fuel line 121 which acts directly upon a valve member (not shown) within the fuel pressure regulator 1, 201. The greater the pressure of the fuel within the control fuel line 121 the more the valve member within the fuel pressure regulator is moved away from a valve seat and hence the greater the amount of fuel that is spilt through the fuel pressure regulator 1, 201.

In use, when the fuel pressure at the inlet 114 is at the correct level, the fuel pressure regulator 1, 201 is in a regulating position, and a proportion of the fuel leaving the transfer pump is split back to its inlet 109.

If the fuel pressure at the inlet 114 subsequently rises above the correct level, the fuel pressure regulator 1, 201 must open further in order to enable a greater amount of fuel to be split through it. The fuel pressure regulator 1, 201 is opened to a greater degree under the influence of fuel pressure within the control fuel line 121, which is at substantially the same pressure as the fuel at the inlet 114. The increased fuel pressure within line 121 exerts a greater force upon the valve member within the fuel pressure regulator 1, 201 and as a result the valve member moves further away from the valve seat, opening up a greater flow area and allowing a greater amount of fuel to be spilt. As more fuel is spilt, less fuel is supplied to the inlet 114 and thus the fuel pressure there reduces. As the fuel pressure at the inlet 114 reduces so does the fuel pressure within the control fuel line 121 and thus the valve member begins to move back towards its seated position, coming to rest when the fuel pressure at the inlet 114 is at the correct level.

If the fuel pressure at the inlet 114 drops below the correct level, the fuel pressure regulator 1, 201 must open by a lesser amount, in order that a smaller amount of fuel is spilt through it. The reduction in the opening of the regulator 1, 201 is attained because the fuel pressure with the control fuel line 121 has been reduced and thus the force exerted on the valve member is reduced. As a result, the valve member moves back towards the valve seat, reducing the flow area and thus reducing the amount of fuel that can be spilt. As less fuel is spilt, more fuel is pumped to the inlet 114, thereby increasing the fuel pressure at that point. As the fuel pressure at the inlet 114 increases, so does the fuel pressure within control fuel line 121 and thus the valve member starts to move away from the valve seat, coming to rest when the fuel pressure at the inlet 114 is at the correct level.

When the system is not in use, the fuel pressure regulator 1, 201 is in a non-regulating position whereby the valve member is seated on the valve seat.

In the fuel pressure regulation system 101 of the present invention, it is envisaged that the use of a conventional fuel pressure regulator would allow cross-contamination between the relatively dirty fuel passing through the spill line 119 (that fuel has only been filtered by the coarse mesh filter 107) and the relatively clean fuel passing along fuel supply line 121 (that fuel has been filtered by the fine mesh filters 111). Such cross-contamination is undesirable because there is the potential for debris to pass into the high pressure pump 115 and also to proceed downstream of the high pressure pump 115 to, for example, the fuel injectors, wherein at any stage it can cause damage to components of the fuel injection system leading to malfunction and/or a decreased working life. Furthermore, it has been found that the fuel pressure regulator can itself suffer from damage from debris carried by the fuel passing through it. Again, this can lead to a loss of regulator function, which may affect engine control, and/or a decreased working life.

Attempts have been made to overcome these problems using complex fuel pressure regulator design. However, such designs are expensive and therefore there is a need for a simpler arrangement that can overcome the problems. This need is addressed by the second aspect of the present invention.

A preferred embodiment of the second aspect of the present invention, the fuel pressure regulator 1, shown in detail in FIG. 2. It comprises a generally circular cross-section valve pin 3 which is slideably located within a generally circular cross-section stepped bore 5 of a regulator housing 7. The regulator housing 7 is located within a bore in a pump housing (not shown).

At a high pressure end, shown generally by reference numeral 9, the bore is provided with a control fuel line connection 8 for connection to the control fuel line 121, as shown in FIG. 1, through which flows filtered diesel fuel. The control fuel line 121 supplies diesel fuel to the fuel pressure regulator 1 at inlet pressure, i.e. fuel at the pressure at which it is supplied to the high pressure pump inlet 114. The fuel has passed through the transfer pump 105, as shown in FIG. 1, and then through a fine mesh filter 111, also as shown in FIG. 1. The fuel passing through control fuel line 121 is referred to hereinafter as filtered fuel.

At a low pressure end, shown generally by reference numeral 11, the bore 5 is connected to a suction line between a fuel tank 103, as shown in FIG. 1, and the transfer pump 105.

Between the high pressure and low pressure ends 9,11 the bore 5 is provided with an unfiltered fuel spill line connection 13 which, in use, is connected to spill line 119, as shown in FIG. 1. The unfiltered fuel spill line 119 spills diesel fuel from the transfer pump 105 at transfer pressure. However, that fuel has passed only through the coarse mesh gauze 107. The fuel passing through fuel spill line 119 is referred to hereinafter as unfiltered fuel.

The valve pin 3 is provided with a blind bore 15 arranged coaxially and which passes along the majority of the length of the valve pin 3, from its low pressure end 11 towards its high pressure end 9. Towards the end of bore 15 adjacent to the high pressure end 11 of the valve pin 3, the valve pin 3 is provided with a cross drilling 17 which passes across its diameter. The cross drilling 17 connects with an annular groove 19 provided around the circumference of the valve pin 3.

The valve pin 3 is provided with a guide section, shown generally by reference numeral 4, between the annular recess 19 and the high pressure end 9. The guide section 4 has a diameter that closely matches that of the stepped bore 5, such that there is only a small clearance 6 between the two components. The provision of the small clearance 6 between the valve pin 3 and the stepped bore 5 enables the valve pin 3 to be guided accurately as it slides through the bore 5. Also, it reduces the annular flow area through which fuel can leak between the high pressure end 9 of the valve pin 3 and the annular recess 19. The high pressure end 9 of the valve pin 3 is provided with a thrust surface 12 upon which acts pressurised fuel from the control fuel line 121.

Towards its low pressure end 11 the diameter of valve pin 3 increases and it is provided with a frustoconical transition section, shown generally by reference numeral 10. A valve face 21 is provided on this transition section 10. The valve face 21 is complementary to a valve seat 23 provided on the stepped bore 5. At the low pressure end 11 of the valve pin 3 there is a spring seat 25 against which a helical compression spring 27 abuts in order to bias the valve pin 3 into a non-regulating position, in which the valve face 21 and valve seat 23 are engaged in a fluidtight manner.

Between the annular recess 19 and the valve seat 21 the valve pin 3 is provided with an intermediate section, shown generally by reference numeral 28.

An upper region 29 of intermediate section 28 has a circular cross-section with a diameter that provides a relatively large clearance 30, typically one hundred microns, between the valve pin 3 and the adjacent section of the wall of the stepped bore 5.

A lower region 31 of the intermediate section 28 is of a diameter significantly smaller than the rest of the valve pin 3.

At the transition regions between the lower region 31, the upper region 29 and the frustoconical region at the lower end of the valve pin 3 there are provided frustoconical surfaces 33,35 respectively.

When the valve pin 3 is in a lower position and the valve face 21 is spaced apart from the valve seat 23 there are three fuel flow paths through the fuel pressure regulator 1.

A first fuel flow path flows from the control fuel line connection 8 to the fuel suction line, indicated by reference numeral 104 in FIG. 1, via the clearance 6, the cross drilling 17 and the bore 15.

A second fuel flow path flows from the fuel spill line connection 13 to the fuel return line 120 via the clearance 30, the drilling 17 and the bore 15.

A third fuel flow path flows from the fuel spill line connection 13 to the fuel return line 120 via the opening between the valve face 21 and the valve seat 23.

When the valve pin 3 is moved upwards so that the valve face 21 enagages with the valve seat 23 in a fluid tight manner the third fuel flow path is closed.

Under normal operating conditions, as described above, the fuel pressure regulator is in a regulating position. If the fuel pressure at the inlet to the high pressure pump 115 increases above a pre-determined maximum value it is necessary to spill a greater amount of the fuel being pumped by the transfer pump 105 back to the transfer pump inlet 109, so that the pressure at the inlet to the high pressure fuel pump 115 can be returned to a level at, or below, the maximum allowable value. This is achieved by opening the fuel pressure regulator 1 to a greater degree.

The fuel pressure regulator 1 is placed in the regulating position, by downwards movement of the valve pin 3, whereby the valve face 21 is spaced apart from the valve seat 23. Downwards movement of the valve pin 3 is produced by the application of pressurised fuel from the control fuel line 121 through the control fuel line connection 8 to the thrust surface 12 on the valve pin 3. The resultant downwardly acting force overcomes the upwardly acting spring force from spring 27 acting on the spring seat 25.

The filtered fuel control line 121 is connected to the high pressure pump inlet 114 and therefore to enable the fuel pressure regulator 1 to open as desired, the relationship between the area of the thrust surface 12 and the spring force provided by spring 27 is chosen accordingly.

When the fuel pressure regulator 1 is in a regulating position fuel from the unfiltered spill line 119 can flow out to the suction line 104 along either the second or the third fuel flow paths.

The unfiltered fuel entering the fuel pressure regulator 1 from the fuel spill line 119 through the spill line connection 13 and flowing out from the fuel pressure regulator 1 along the second fuel flow path, is drawn into the annular recess 19 and through the cross drilling 17 and the bore 15 because the fuel pressure in those regions is below the pressure of the fuel in the clearance 6 and the clearance 30 and is typically below atmospheric pressure.

When the fuel pressure at the high pressure pump inlet 114 has been sufficiently reduced the fuel pressure within the control fuel line 121 is also reduced and thus the net force acting on the valve pin 3 is in an upwards direction. The valve pin 3 moves upwards, under the action of the spring 27, to a position whereby the amount of fuel that can be spilt through the regulator 1 is reduced.

Under certain conditions the valve face 21 engages with the valve seat 23 in a fluidtight manner thereby closing the pressure regulator 1. When the fuel pressure regulator 1 is closed the third fuel flow path is closed but the second fuel flow path remains open and thus, because the fuel entering the regulator 1 through the fuel spill line connection 13 can exit via the drilling 17 and the bore 15 it does not pass into the small clearance 6.

In this way the fuel pressure regulator 1 is protected from damage by debris within the unfiltered fuel and the cross-contamination of the filtered fuel with the unfiltered fuel is prevented.

An alternative form of fuel pressure regulator 201 is also envisaged and is shown in FIG. 3. Any features of the alternative embodiment equivalent to those features of the preferred embodiment are denoted by the same reference numerals prefixed with the number.

The fuel pressure regulator 201, comprises a generally circular cross-section valve pin 203 which is slideably located within a generally circular cross-section stepped bore 205 of a regulator housing 207. The regulator housing 207 is located within a bore in a pump housing (not shown).

At a high pressure end, shown generally by reference numeral 209, the bore 205 is connected to a filtered fuel control line 121 by a fuel control line connection 208. The filtered fuel control line 208 supplies diesel fuel at inlet pressure, i.e. fuel at the pressure at which it is supplied to the inlet 114 of the high pressure pump 115, shown in FIG. 1. The fuel has passed through a transfer pump, for example a pump as indicated in FIG. 1 by the reference numeral 105 and then through a fine mesh filter, shown in FIG. 1 by reference 111. The fuel passing through filtered fuel supply line 208 is referred to hereinafter as filtered fuel.

At a low pressure end, shown generally by reference numeral 211, the bore 205 is connected to a low pressure suction line between the fuel tank 103 and the transfer pump 105.

Between the high pressure and low pressure ends 209,211 the bore 205 is connected to unfiltered fuel spill line 119 via a spill line connection 213. The unfiltered fuel spill line 213 spills diesel fuel from the transfer pump 105 at transfer pressure. However, that fuel has passed only through the coarse mesh gauze 107. The fuel passing through fuel spill line connection 213 is referred to hereinafter as unfiltered fuel.

The valve pin 203 is provided with a co-axial blind bore 215 which passes along the majority of the length of the valve pin 203 from its low pressure end 211 towards its high pressure end 209. Towards the end of bore 215 adjacent to the high pressure end of the valve pin 203, the valve pin 203 is provided with a cross drilling 217 which passes across its diameter. The cross drilling 217 connects with an annular groove 219 provided around the circumference of the valve pin 203.

The valve pin 203 is provided with a guide section, shown generally by reference numeral 204, between the annular recess 219 and the high pressure end 209. The guide section 204 has a diameter that closely matches that of the stepped bore 205, such that there is only a small clearance 206 between the two components. The provision of a small clearance 206 between the valve pin 203 and the stepped bore 205 enables the valve pin 203 to be accurately guided as it slides through the bore 205 and also reduces the annular flow area through which fuel can leak between the high pressure side of the valve pin 203 and the annular recess 219. The high pressure end 209 of the valve pin 203 is provided with a thrust surface 212 upon which pressurised fuel from the filtered fuel supply line 208 can act.

Towards its low pressure end 211 the valve pin 203 is provided with a valve face region, shown generally by reference numeral 251. Passing in a direction from the high pressure end 209 to the low pressure end 211 the valve face region 251 comprises adjacently a frustoconical region 253, a cylindrical long overlap section 255, and a flat annular valve face 221, complementary to a flat valve seat 223 provided on the stepped bore 205.

When the fuel pressure regulator 201 is in a regulating position, i.e. when the valve face 221 of the valve pin 203 is spaced apart from the valve seat 223, the whole of the overlap section 255 is located outside of the bore 205 such that there is a regulating opening between the valve pin 203 and the bore 205. Due to the shape of the frustoconical region 253 the flow area of the opening increases as the distance between the valve face 221 and valve seat 223 increases.

When the fuel pressure regulator 201 is in a non-regulating position, i.e. when the valve face 221 and the valve seat 223 are engaged in a fluidtight manner, at least a part of the overlap region 255 is located adjacent to the bore 205 such that there is a small start-up clearance 259, typically 10 microns, between the valve pin 203 and the bore 205.

At the low pressure end of the valve pin 203 there is a spring seat 225 against which a helical compression spring 227 seats, in order to bias the valve pin 203 into the non-regulating position.

Between the annular recess 219 and the valve face 221 the valve pin 203 is provided with an intermediate section, shown generally by reference numeral 228, provided with an upper region 229 of circular cross-section.

The intermediate section 228 is located adjacent to a widened section 257 of bore 205. The widened section 257 and the intermediate section 228 are arranged so that when the fuel pressure regulator 201 is in the regulating, position, the whole of the upper region 229 is located relative to the widened section 257 such that there is a relatively large regulating clearance 230, typically one hundred microns, provided between the upper region 229 and the wall of the bore 205.

When the fuel pressure regulator 201 is in the non-regulating, position, only a part of the upper region 229 is located adjacent to the widened section 257, such that a relatively small start-up or priming clearance 261, typically 10 microns, is provided between a part of the upper region 229 and the bore 205.

The valve pin 203 and the bore 205 are configured such that whenever the valve pin 203 is in a position whereby there is a start-up clearance 261 between the valve pin 203 and the bore 205, there is also only a start-up or priming clearance 259 between the long overlap region 255 and the bore 205. Only once the valve pin 203 is in a position such that there is a regulating clearance 230 between the whole of the upper region 229 and the bore 205 does an opening occur between the frustoconical region 253 and the valve bore 205.

In between the upper region 229 and the frustoconical region 253 there is a necked region 231 of the valve pin 203 which is of a diameter significantly smaller than the rest of the valve pin 203.

At the transition region between the necked region 231 and the upper region 229 there is provided a frustoconical surface 233.

When the fuel pressure regulator 201 is in the regulating position there are three fuel flow paths through the fuel pressure regulator 201.

A first fuel flow path flows from the filtered control fuel line connection 208 to the fuel suction line, indicated by reference numeral 104 in FIG. 1, via the clearance 206, the cross drilling 217 and the bore 215.

A second fuel flow path flows from the unfiltered fuel spill line connection 213 to the fuel suction line 104 via the clearance 230, the drilling 217 and the bore 215.

A third fuel flow path flows from the unfiltered fuel spill line connection 213 via the opening between the bore 205 and the frustoconical region 253.

When the fuel pressure regulator 201 is in a non-regulating position, there are five possible flow paths. The first and second flow paths are those as described above, i.e. when the valve pin is in the uppermost seated position. The third fuel flow path described above is closed. The fourth fuel path flows from the unfiltered fuel spill line connection 213 to the fuel suction line 104 via the start-up clearance 261, the drilling 217 and the bore 215.

In a non-regulating position in which the valve pin 203 moves so that the valve face 221 and valve seat 223 are spaced apart a fifth fuel flow path is opened. The flow path flows between the unfiltered fuel spill line connection 213 via the start-up clearance 259 to the valve opening between valve face 221 and valve seat 223.

In operation, if the pressure at the high pressure pump inlet 114 increases above a pre-determined maximum value it is necessary to spill more of the fuel being pumped by the transfer pump 105 from the outlet of the transfer pump 105 back to the inlet of the transfer pump 105 so that the pressure at the inlet to the high pressure fuel pump 115 can be returned to below the maximum pre-determined value. This is achieved by opening the fuel pressure regulator 201 to a greater degree.

The fuel pressure regulator 201 is opened by downwards movement of the valve pin 203 such that the valve face 221 is spaced apart from the valve seat 223. Downwards movement of the valve pin 203 is produced by the application of pressurised fuel entering the regulator through the filtered control fuel line connection 208 from a control fuel line 121 to the thrust surface 212 on the valve pin 203. The resultant downwardly acting force overcomes the upwardly acting spring force from spring 227, acting on the spring seat 225.

The filtered control fuel line 121 is connected to the inlet to the high pressure pump 115 and therefore to enable the fuel pressure regulator 201 to open as desired, the relationship between the area of the thrust surface 212 and the spring force provided by spring 227 is chosen accordingly. When the fuel pressure regulator 201 is opened fuel from the unfiltered spill line 213 can flow out to the suction line to along either the second or the third fuel flow paths.

The unfiltered fuel entering the fuel pressure regulator 201 through the fuel spill line 213 and flowing out from the fuel pressure regulator 201 along the second fuel flow path is drawn through the cross drilling 217 and the bore 215 because the fuel pressure there is below the pressure of fuel in the clearance 206.

When the fuel pressure at the inlet to the high pressure pump 115 has been sufficiently reduced the net force acting on the valve pin 203 is in an upwards direction and the valve pin 203 moves upwards whereby the valve face 221 moves towards the valve seat 223 thereby reducing the possible flow through the pressure regulator 201.

When the fuel pressure regulator 201 is in the non-regulating, position the third fuel flow path is closed but the second fuel flow path remains open and thus, because the fuel entering the regulator from the fuel spill line 213 can exit via the drilling 217 and the bore 215 it does not pass into the small clearance 206.

In this way the fuel pressure regulator 201 is protected from damage by debris within the unfiltered fuel and the cross-contamination of the filtered fuel with the unfiltered fuel is prevented.

If it is necessary to prime the low pressure fuel system, for example, because it has been run dry, fuel is pumped into the fuel pressure regulator 201 by the transfer pump 105. The small start-up or priming clearance 261 allows only a small amount of fuel to pass through it and thus exit the fuel pressure regulator 201 to the fuel return line 120. The remainder of the fuel flows into the fuel supply line 110 to the high pressure pump 115 and forces out any air within that fuel supply line 110. The pressure within the fuel control line 121 to the fuel pressure regulator 201 increases and the valve pin 203 moves downwards lifting the valve face 221 off the valve seat 223. After a certain displacement of the valve pin 203 the regulating clearance 230 is opened and a greater amount of fuel is allowed to pass to the fuel return line 120. At this point the overlap region 255 is still within the bore 205 such that the start-up or priming clearance 259 is still retained.

Further movement of the valve face 221 away from the valve seat 223 creates the opening between the frustoconical region 253 and the bore 205. At this point the fuel pressure regulator 201 has moved into the regulating position.

The invention claimed is:

1. A fuel pressure regulator comprising a bore within which is located a valve member moveable from a non-regulating position of the fuel pressure regulator wherein the valve member is moved in a direction away from a first end of the bore so as to engage fluidtightly a valve seat defined on the bore, to a regulating position of the fuel pressure regulator wherein the valve member is spaced apart from the valve seat, a control fuel line connection positioned at a second end of the bore, such that, in use, any fuel entering the bore through the control fuel line connection acts upon a thrust surface provided on the valve member resulting in a force acting on the valve member in a direction to disengage the valve member from the valve seat, an upper clearance between the valve member and the second end of the bore, a fuel spill line connection positioned in the bore such that, in use, any fuel entering the bore through the fuel spill line connection enters a region between the first end and the second end of the bore, characterised in that there is provided a lower clearance in the bore between the first end and the second end, and a leak passageway connected from a point between the lower clearance and the second end of the bore, and a fuel return line connection, such that, in normal operating use, a fuel flow path from the fuel spill line connection to the fuel return line connection is kept open when the fuel pressure regulator is in the non-regulating position.

2. A fuel pressure regulator as claimed in claim 1, wherein the leak passageway passes through the valve member.

3. A fuel pressure regulator as claimed in claim 1, wherein there is provided an expansion volume between the lower clearance and the upper clearance and the leak passageway is fluidly connected to that expansion volume.

4. A fuel pressure regulator as claimed in claim 3, wherein the expansion volume extends around the periphery of the valve member.

5. A fuel pressure regulator as claimed in claim 1, wherein, in normal operating use, the cross-sectional area of the lower clearance is large enough to enable free passage of any contaminants within the fuel entering the fuel pressure regulator through the fuel spill line connection.

6. A fuel pressure regulator as claimed in claim 1, wherein, in normal operating use, the cross-sectional area of the upper clearance is small enough to prevent free passage of any contaminants within the fuel entering the fuel pressure regulator through the fuel spill line connection.

7. A fuel pressure regulator as claimed in claim 1, wherein the lower clearance is located between the valve member and the bore.

8. A fuel pressure regulator as claimed in claim 1, further comprising, in a non-regulating position of the fuel pressure regulator a lower start-up clearance and an upper start-up clearance located in the bore between the first end and the second end, the start-up clearances having a smaller cross-sectional flow area than the lower clearance.

9. A fuel pressure regulator as claimed in claim 1, wherein the bore is provided with a widened region of increased cross-sectional area between the first end and the second end and the valve member comprises an upper region and an overlap region, wherein, in use, the upper region is located between the fuel spill line connection and the second end and the overlap region is located between the fuel spill line connection and the first end and wherein when the fuel pressure regulator is in a non-regulating position there is only a start-up clearance between a part of the upper region and the bore and wherein when the fuel pressure regulator is in the open position all of the upper region is located adjacent to the widened region such that the lower clearance is provided between the valve member and the region.

10. A fuel pressure regulator as claimed in claim 9, wherein, in use, when the valve member moves from the non-regulating position towards the regulating position of the fuel pressure regulator is open, after a first stage of movement of the valve member the upper clearance is provided between the valve member and the widened region and the lower start-up clearance is provided between the valve member and the bore and after a second stage of movement of the valve member the upper clearance is provided between the valve member and the widened region and the lower clearance is provided between the valve member and the bore.

* * * * *